(12) United States Patent
Gopalarathnam (10) Patent No.: US 9,397,926 B2
(45) Date of Patent: Jul. 19, 2016

(54) PEER-INFLUENCED AGGREGATE MEMBER SELECTION

(71) Applicant: DELL PRODUCTS L.P., Round Rock, TX (US)

(72) Inventor: Sudharsan Dhamal Gopalarathnam, Channai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 165 days.

(21) Appl. No.: 14/451,713

(22) Filed: Aug. 5, 2014

(65) Prior Publication Data

US 2016/0043933 A1    Feb. 11, 2016

(51) Int. Cl.
*H04L 12/721* (2013.01)
*H04L 12/707* (2013.01)
*H04L 12/709* (2013.01)

(52) U.S. Cl.
CPC .............. *H04L 45/124* (2013.01); *H04L 45/22* (2013.01); *H04L 45/245* (2013.01)

(58) Field of Classification Search
CPC .................................................. H04L 45/124
USPC ........................................................ 709/226
See application file for complete search history.

(56) References Cited

U.S. PATENT DOCUMENTS

| | | | | |
|---|---|---|---|---|
| 5,918,017 A * | 6/1999 | Attanasio | ................ | H04L 29/06 709/224 |
| 6,778,531 B1 * | 8/2004 | Kodialam | ............... | H04L 12/18 370/256 |
| 7,212,528 B2 * | 5/2007 | Kuhl | ................... | H04L 12/5601 370/389 |
| 7,584,301 B1 * | 9/2009 | Joshi | ................... | H04L 67/1002 709/203 |
| 7,590,149 B1 * | 9/2009 | Bharali | ................... | H04L 45/00 370/235 |
| 7,844,432 B1 * | 11/2010 | Jones | ...................... | H04L 47/10 370/395.53 |
| 8,663,004 B1 * | 3/2014 | Xu | .......................... | A63F 13/12 463/20 |
| 8,773,992 B2 * | 7/2014 | Lai | .......................... | H04L 45/04 370/230.1 |
| 8,989,198 B2 * | 3/2015 | Jansen | .............. | H04L 29/12933 370/248 |
| 2004/0165598 A1 * | 8/2004 | Shrimali | ............... | H04L 49/254 370/395.42 |
| 2004/0170125 A1 * | 9/2004 | O'Neill | ................. | H04L 12/185 370/230 |
| 2009/0268614 A1 * | 10/2009 | Tay | .......................... | H04L 47/10 370/236 |
| 2011/0153810 A1 * | 6/2011 | Raja | ..................... | H04L 67/1029 709/224 |
| 2011/0271005 A1 * | 11/2011 | Bharrat | ............... | H04L 61/1511 709/232 |
| 2012/0008496 A1 * | 1/2012 | Saavedra | ............ | H04L 41/5019 370/231 |

(Continued)

OTHER PUBLICATIONS

Hofstede et al., "Flow Monitoring Explained: From Packet Capture to Data Analysis With Netflow and IPFIX", 2014.*

(Continued)

*Primary Examiner* — O. C. Vostal
(74) *Attorney, Agent, or Firm* — North Weber & Baugh LLP (57) ABSTRACT

Embodiments of the present invention provide the ability to allow a peer or remote device to influence aggregate member selection in an aggregate group of members for a data flow. In embodiments, local-side weights and remote-side weights may be assigned to each member in an aggregate group of members. Using these weights, a global value for each member in the aggregate group may be calculated. Given these global values, a member from the aggregate group of members may be selected for egress of the new flow based upon the global values.

20 Claims, 10 Drawing Sheets

(56) References Cited

U.S. PATENT DOCUMENTS

| | | | | |
|---|---|---|---|---|
| 2012/0066375 A1* | 3/2012 | Phaal | ................... | H04L 43/022 709/224 |
| 2012/0163196 A1* | 6/2012 | Jansen | .............. | H04L 29/12933 370/248 |
| 2013/0191223 A1* | 7/2013 | Harris | .............. | G06F 17/30528 705/14.66 |
| 2013/0254184 A1* | 9/2013 | Ellsworth | ......... | G06F 17/30038 707/722 |
| 2013/0294236 A1* | 11/2013 | Beheshti-Zavareh | ... | H04L 47/22 370/235 |
| 2015/0103662 A1* | 4/2015 | Valero | .................. | H04L 4/2441 370/235 |

OTHER PUBLICATIONS

Mann et al., "Living on the Edge: Monitoring Network Flows at the Edge in Cloud Data Centers", 2013.*
Chen et al., "Internet Performance Monitoring", 2002.*
Elwald et al., "MATE: MPLS Adaptive Traffic Engineering", 2001.*
Fortz et al., "Internet Traffic Engineering by Optimizing OSPF Weights", 2000.*
Argyroupoulos et al., "PaFloMon—A Slice Aware Passive Flow Monitoring Framework for OpenFlow Enabled Experimental Facilities", 2012.*
Gunnar, "Towards Robust Traffic Engineering in IP Networks", 2007.*
Mathis et al., "A Framework for Defining Empirical Bulk Transfer Capacity Metrics", RFC 3148, 2001.*
Almes et al., "A Round-trip Delay Metric for IPPM", RFC 2681, 1999.*
Estan et al., "Building a Better NetFlow", 2004.*
Choi et al., "On the Accuracy and Overhead of Cisco Sampled NetFlow", 2005.*
Lopez et al., "Monitoring an acedemic network with Netflow", 2004.*

* cited by examiner

PEER-INFLUENCED AGGREGATE MEMBER SELECTION

BACKGROUND

1. Field of Invention

The present invention relates generally to data communication and devices, and relates more particularly to selection of a member or members for data flow in a network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As networking continues to evolve, new features are developed to improve performance, efficiency, or both. Included in these new features are concepts related to link aggregation. Link aggregation encompasses various methods of combining or grouping (i.e., aggregating) multiple network connections to increase data throughput while still supporting fault tolerance in case of failures.

Link aggregation can involve grouping two or more physical data network links between network devices into one logical link in which the two or more physical network links may be treated as a single logical link. This logical link forms a link aggregation group or LAG.

Another instance in which the route of traffic flow is considered from among a group of links or members is during routing. At times, there may be multiple paths of equal cost through which data may be routed to the next hop. In such instances where next-hop packet forwarding to a destination may occur over two or more "best paths," equal-cost multipath routing (ECMP) may be employed.

In current mechanisms, the selection of a member in an aggregate group, like a LAG or ECMP, is currently done based on hashing or other mechanisms, which take into account only parameters within a switch, packet fields, etc. Since the decision is based solely on local metrics, such as selection may be sub-optimal when considering the downstream flow.

Accordingly, what is needed are systems and methods that assist in making better flow path selections for a networking device.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific examples and details are set forth in order to provide an understanding of the invention. It will be apparent, however, to one skilled in the art that the invention may be practiced without these details. Well-known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including some steps being done concurrently.

The terms "packet" or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "flow," "data," or "data traffic" may be replaced by other terminologies referring to a group of bits, such as "datagram" or "cell." It shall also be noted that the terms "link," "member," "path," "port," "connection," "member," "route," and the like may be used interchangeable in certain context to refer to a pathway from one device to another device for data flow.

It shall also be noted that although embodiments described herein may be within the context of link aggregation groups (LAGs), virtual link trunking (VLTs), ECMP, spine-leaf architectures, and the like, the invention elements of the current patent document are not so limited. Accordingly, the invention elements may be applied or adapted for use in other contexts.

1. General Overview

As noted above, when an information handling system selects a member in a group by considering only parameters of local metrics, and not considering the peer or remote system(s), the best route overall may not be chosen. There can be instances when it is beneficial to consider a peer device metric or metrics in the selection of a member for a flow. In such instances, the selection of an optimal candidate may be performed using a combination of local as well as peer metrics.

Currently, member selection mechanisms use techniques like hashing, where the packet fields and local parameters play the central role in member selection for a flow. Consider, by way of illustration, the following example.

Figure 1:
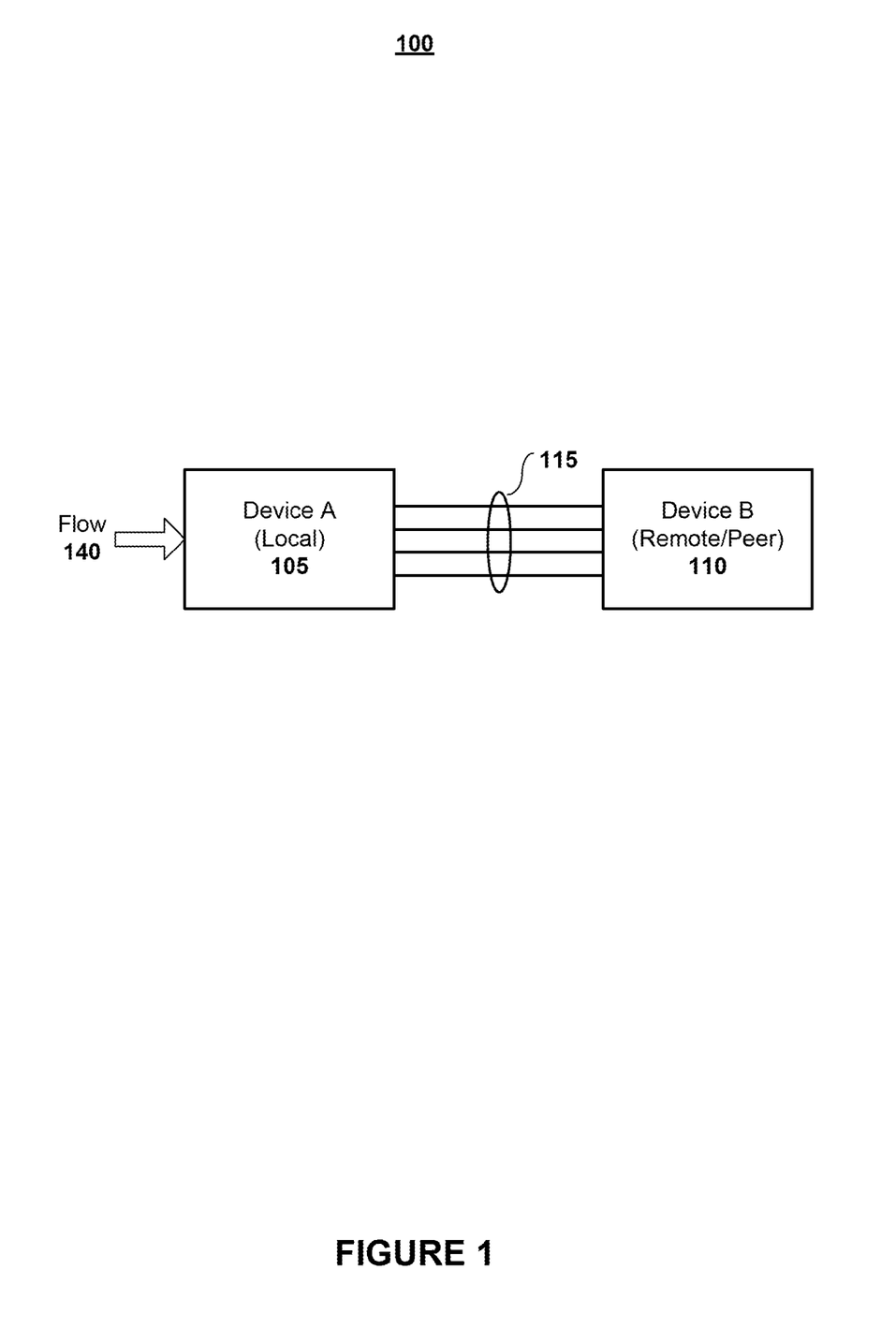
FIG. 1 depicts two devices connected by an aggregate group of members that receives a new flow that needs to be transmitted from one device to the other.

Consider two switches, Switch A and Switch B, as shown in FIG. 1. Connecting these two switches are four ports joined to form a LAG 115. Further consider a new flow 140 that arrives on Switch A 105 and that has a destination which will cause it to egress on the LAG 115. The current mechanisms may use packet fields or port metrics of Switch A to determine which one of the four ports to send the data.

Figure 2:
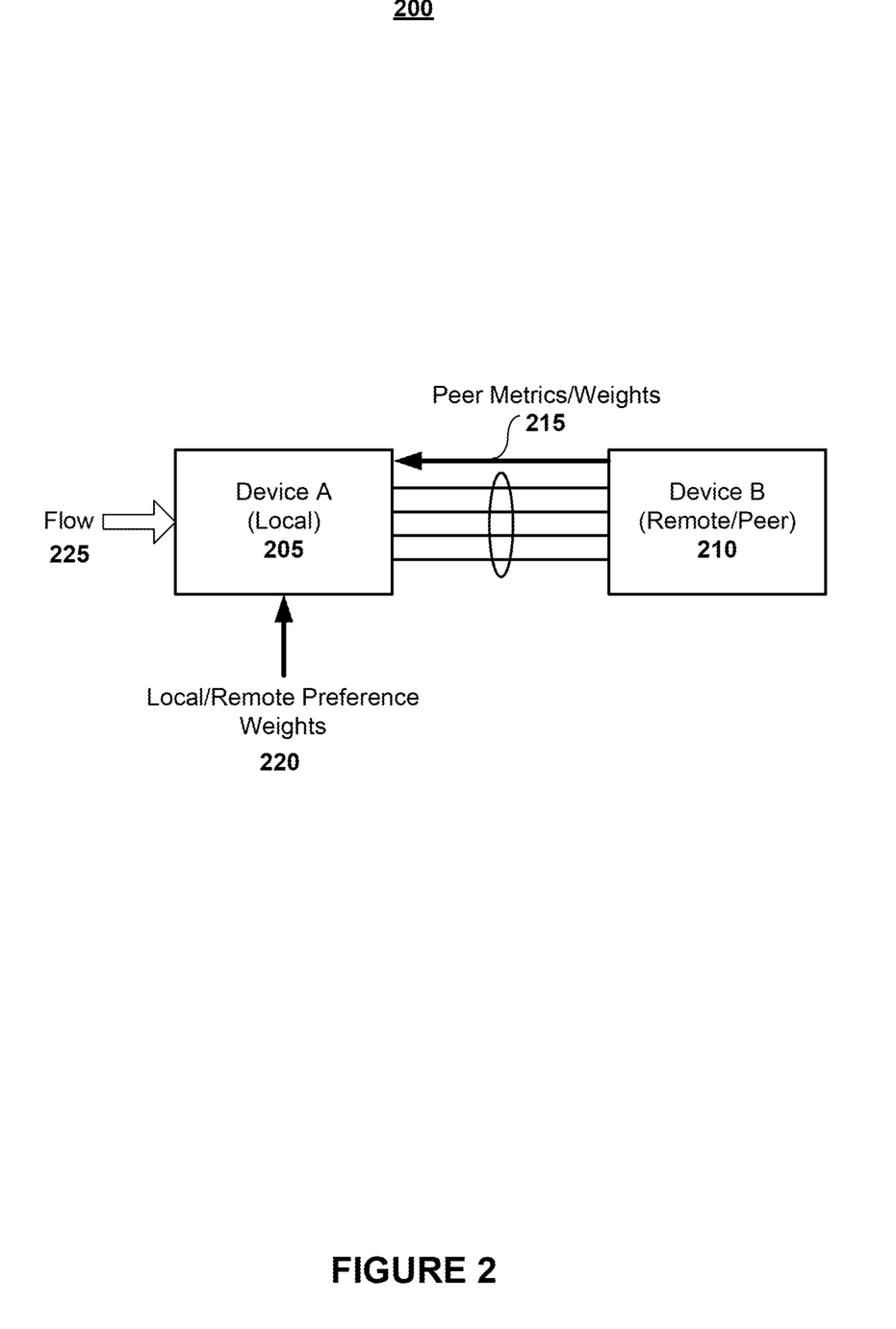
FIG. 2 depicts two devices connected in similar configuration as shown in FIG. 1; however, also depicted is the inclusion of information from the peer device when deciding a member for the flow, according to embodiments of the present invention.

Accordingly, aspects of the present invention comprise using metrics from the peer end when selecting a member for data flow. In the cases of LAG or ECMP, the peer (e.g., Device B in this example) may be a directly connected networking switch with a LAG on other end or a VLT domain. FIG. 2 depicts the same configuration of connected devices, Device A and Device B, as shown in FIG. 1; however, also depicted in FIG. 2 is the inclusion of information from the peer device when deciding a member for a flow. As shown in FIG. 2, metrics or weighting factors 215 from the remote or peer device, Device B 210, may be transmitted to the local device, Device A 205, that is trying to ascertain which member in the LAG or ECMP is best to receive the flow 225. In embodiments, the metrics 215 from the peer may be based on the flow's destination in the peer. Support for such aspects is provided in hardware chipsets and devices, such as (by way of example and not limitation) the Broadcom® BCM56540 high-bandwidth 1 GBE/10 GBE/40 GBE multilayer Ethernet switch networking product provided by Broadcom Corporation of Irvine, Calif., which include a feature called Dynamic Load Balancing (DLB). In DLB, a new flow is assigned a member based on member value in a register.

In embodiments, the optimal member for a flow may be chosen based on local and peer-end metrics. The peer-end may assign weightage or metrics to each link in a LAG and a member selection methodology may take this weightage along with weightage or metrics in the local end to make a collective decision. In embodiments, weightage considerations in the local device may include preference weights 220. In embodiments, these preference weights may be user selected and may be set to provide more weighting/influence for some or all of the local device metrics over the peer device metrics, or vice versa.

Figure 3:
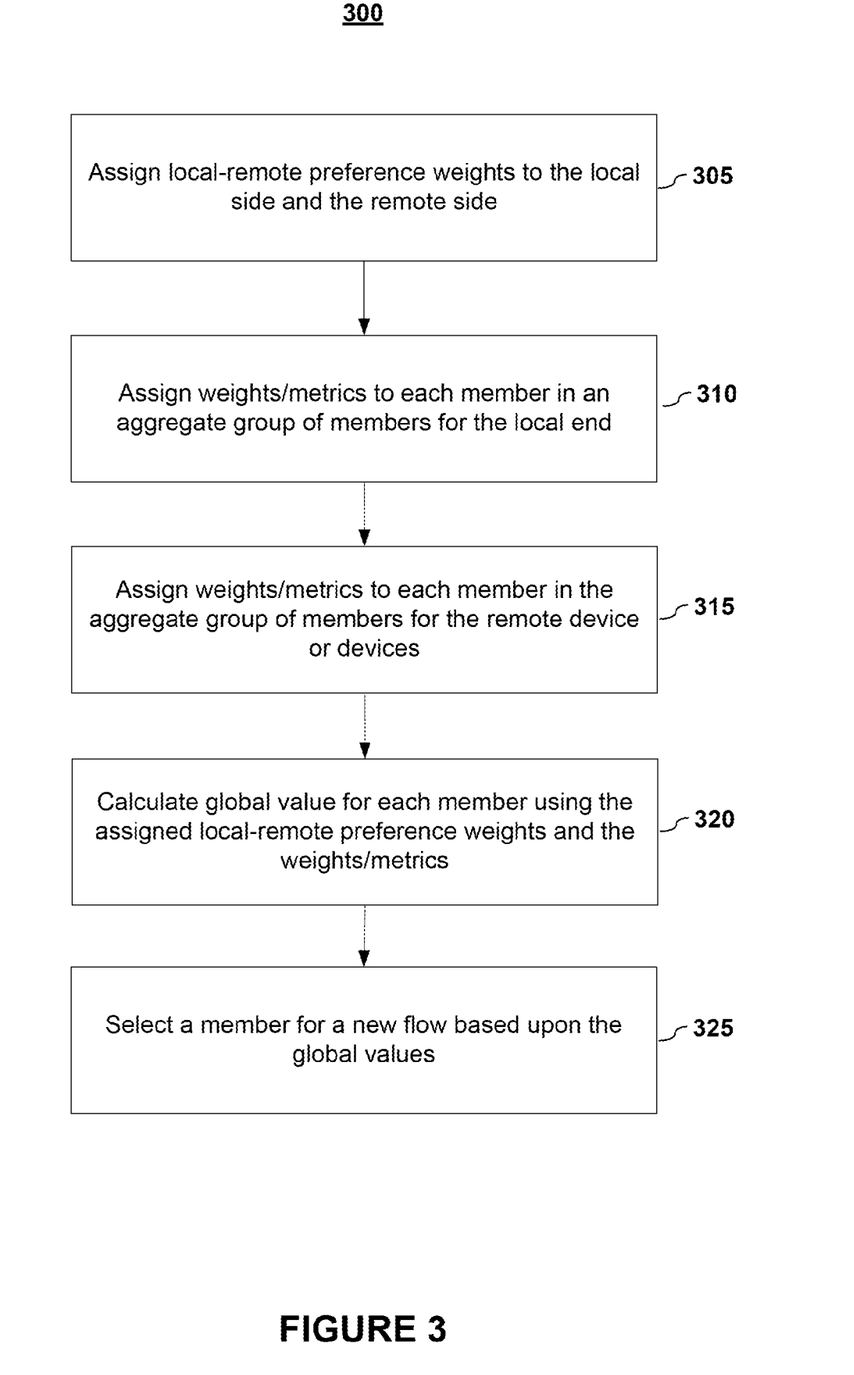
FIG. 3 depicts a methodology for selecting a member for a flow according to embodiments of the present invention.

FIG. 3 depicts a methodology for selecting a member for a flow according to embodiments of the present invention. In embodiments, local-remote preference weights (e.g., Preference Weights 220 in FIG. 2) are assigned (305) to the local side and the remote side. As noted above, these weights may be user-selected weights/preferences. For example, if an administrator wants to give more preference to the local device over the remote device, the weights may be defined such that local metrics have more influence in selecting the member than remote ones do. For example, the local metrics may have a preference weighting of 0.60 and the remote metrics may have a preference weighting of 0.40. It shall be noted that a plurality of preference weighting factors may be used between or among the local and remote device or devices. It shall be noted that the preference weighs may be subjectively set by a user, may be objectively set based upon one or more metrics, or may be a combination thereof.

In embodiments, weights are assigned (310) to each member in an aggregate group (e.g., a LAG or ECMP) of ports/members at the local end, and weights are also assigned (315) to each member in the aggregate group of members at the remote device or devices.

In embodiments, a global weight for each member in the group may be calculated (320) using the assigned local-remote preference weights and the weights/metrics. For example, if the preference weights for the local end are the remote end are $P_L$ and $P_R$ (respectively) and the local metric and remote metric values for member N in the group are $M_{N\_L}$ and $M_{N\_R}$ (respectively), then a global weight for member N ($G_N$) may be calculated as:

$$G_N = P_L \times M_{N\_L} + P_R \times M_{N\_R}$$

One skilled in the art shall recognize that a number of ways exists for combining or weighting factors and metrics and that no particular methodology is critical to the present invention.

In embodiments, once a global value for each of the members in the group has been calculated, a member with the best value may be selected (325) for a new flow.

In embodiments, the selection of a member may be achieved via a function call in which metrics are passed to an algorithm that uses the metrics and returns the optimal member: Optimal member=Member_choose_Alg(Local metric, Peer metric).

2. Embodiments of Illustrative Use Cases

To help further explain aspects of the present invention, the following use cases are provided by way of illustration and not limitation.

a. Use Case #1

Figure 4:
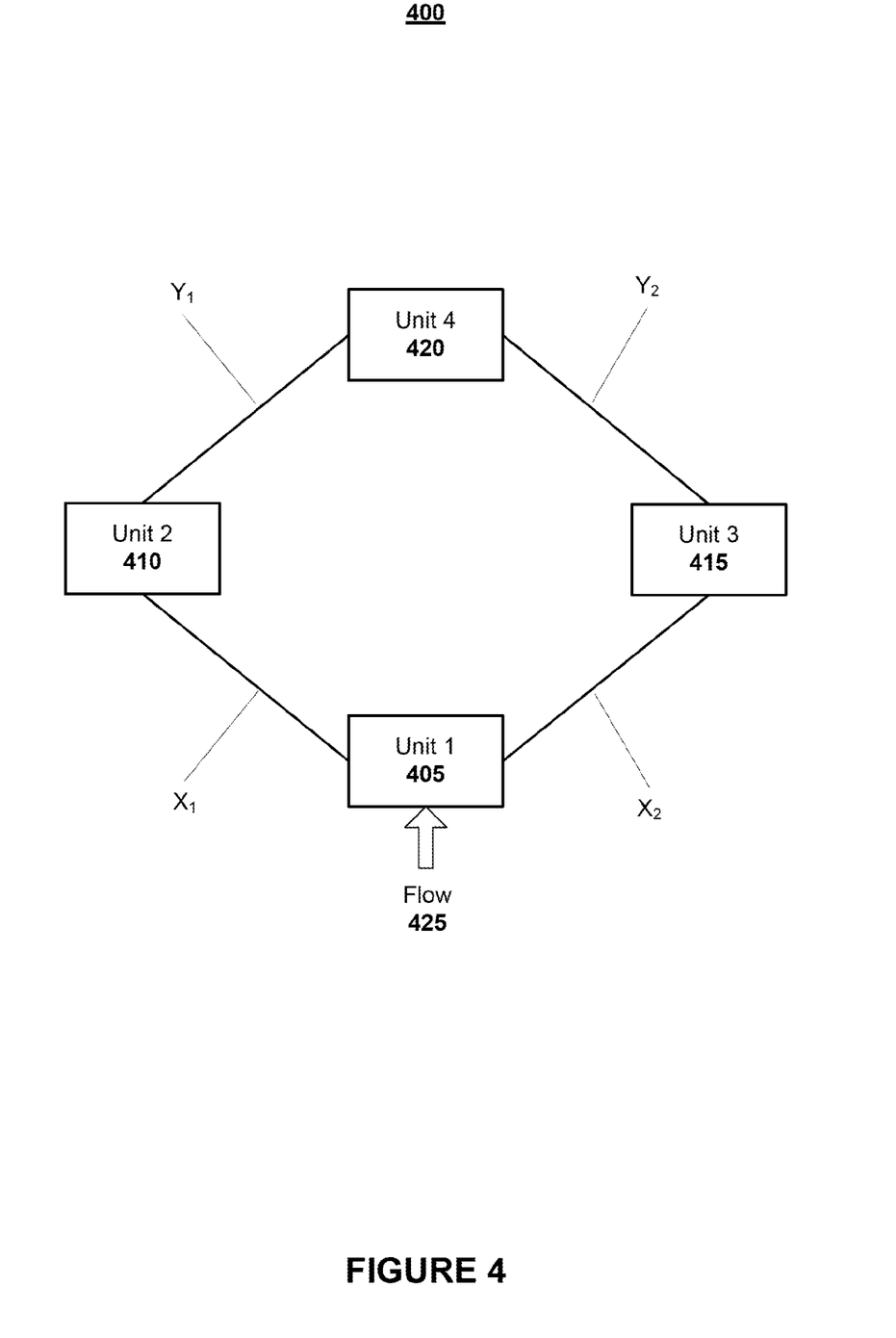
FIG. 4 depicts an example use case according to embodiments of the present invention.

FIG. 4 depicts an example use case according to embodiments of the present invention. Consider an aggregate group from Unit 1 450 terminating on two nodes, Unit 2 410 and Unit 3 415. Possible examples of such a topology include VLT and leaf-spine architectures. The optimal member for a new flow arriving in Unit 1 may be chosen in the following manner.

In embodiments, Unit 1 assigns weights to each of the port in the aggregate group, which weights may be based upon internal metric(s) and methods. Similarly, Unit 2 and Unit 3 also assign remote weights for the aggregate group.

Examples of internal metric(s) or methodologies that may be used to generate the weights include (but are not limited to):

(1) egress accounting or queue size at local end and ingress accounting at peer end; and (2) local egress link utilization of each of ports in aggregate group and remote utilization from Unit 2 and Unit 3 towards a host or another switch (e.g., Unit 4 420) when traffic is distributed from this setup converge towards a single destination as shown in FIG. 4. This is typical in cases of VLT and leaf-spine architectures. Thus, in embodiments, the local weights $X_i$ may be derived from local link utilization in the link from Unit 1 to Unit 2 and Unit 1 to Unit 3 and the remote weights $Y_i$ may be based upon remote link utilization from Unit 2 to Unit 4 and Unit 3 to Unit 4, as shown in FIG. 4.

Apart for metrics assigned using internal metrics and methodologies, in embodiments, a user may assign weights for the local end and the remote end. To help reduce confusion, these values may be referred to as "preference weights" to avoid confusion with internal weights assigned for each port. By way of illustration, assume that a user assigns preference "a" for the local side and "b" for the remote sides.

Based on a chosen methodology or methodologies, each aggregate member may be assigned weight on regular bases. Let the local weights be $X_1, X_2, X_3 \ldots X_n$ where there are n members in the aggregate group. Similarly, let the remote weights assigned be $Y_1, Y_2, Y_3 \ldots Y_n$.

In embodiments, a global weight for a member is chosen as a weighted mean of the local and remote weights. The weighted mean may be based on local and remote preference supplied by the user.

Global weight for member 1:

$$W_1 = (aX_1 + bY_1)/(a+b)$$

Global weight for member 2:

$$W_2 = (aX_2 + bY_2)/(a+b)$$

...

Global weight for member n:

$$Wn = (aX_n + bY_n)/(a+b)$$

Once these global weights are calculated, the member associated with the best global weight among the global weights is chosen as the optimal member:

$$\text{Optimal member for a new flow} = \text{Max }[W_1, W_2 \ldots W_n]$$

In embodiments, the optimal member selection may be done at set intervals, which may be configured by a user. In embodiment, the optimal member chosen would be assigned when a new flow arrives within the interval.

b. Use Case #2

In the prior example, the X and Y weights were obtained from internal metrics and chosen based on a selected methodology; and, a and b were user-supplied inputs that indicated how much preference to the local end received in the global weighting and how much preference to the peer end received in the global weighting.

Embodiments may include weighting methodologies based upon Quality of Service (QoS) memory management unit (MMU) accounting, in which $X_1, X_2, \ldots X_n$ may be derived internally from egress accounting or port queue sizes at the local end and $Y_1, Y_2, \ldots Y_n$ may be derived from ingress accounting of the peer end on the ports where the links from aggregate group terminate.

Figure 5:
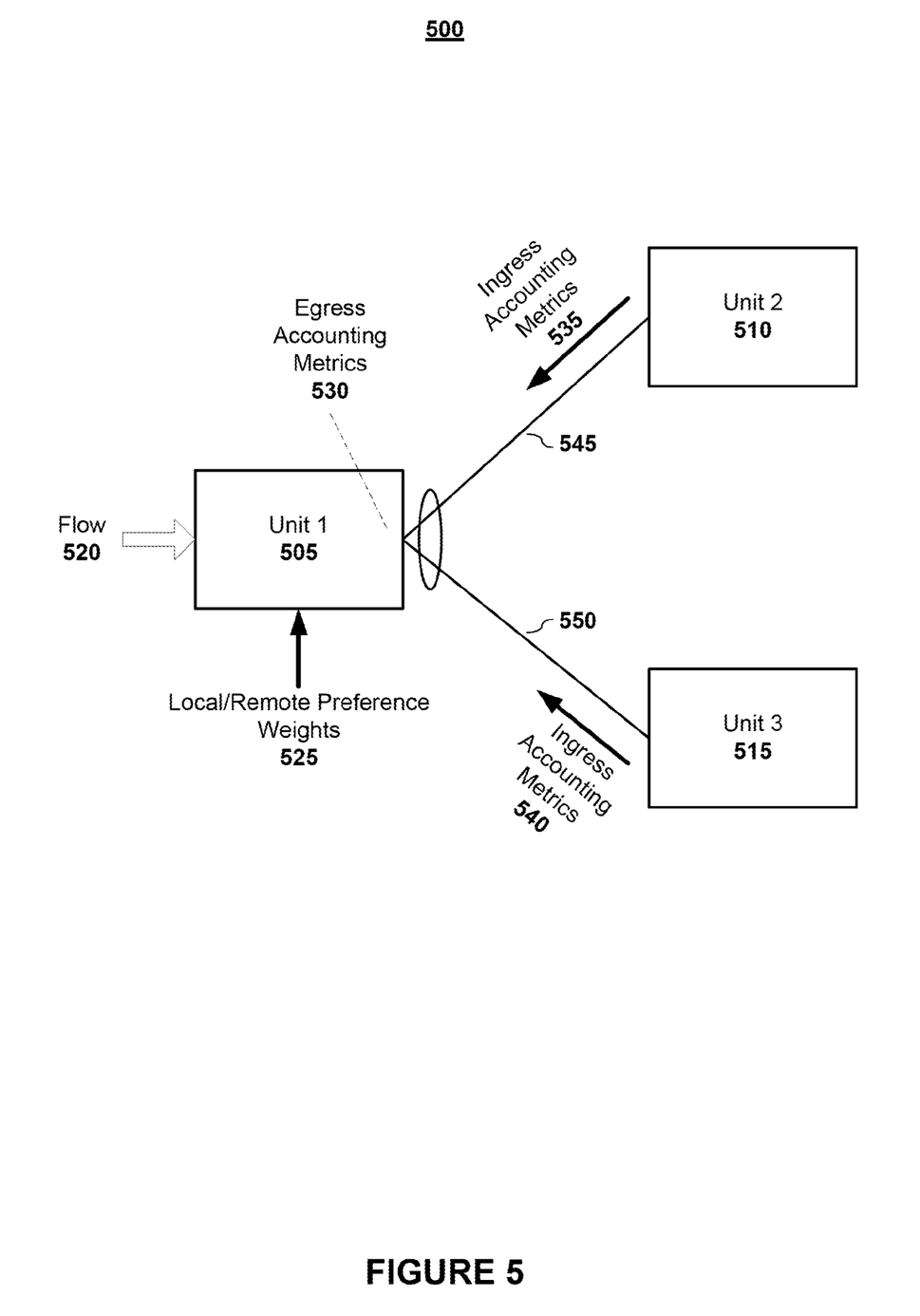
FIG. 5 depicts another example use case according to embodiments of the present invention.

FIG. 5 depicts another example use case according to embodiments of the present invention. Consider the simple topology in FIG. 5 in which Unit 1 505 has a LAG connected to Unit 2 510 and Unit 3 515 (VLT/leaf-spine architectures). As noted previously, in Broadcom chipsets, there are two types of MMU resource accounting—(1) ingress accounting done at the ingress port groups and (2) egress accounting done at the egress queue. For QoS data, congestion is detected using ingress accounting and correspondingly priority flow control (PFC) or pause frame packets may be generated on the ingress port. Current dynamic load balancing (DLB) mechanisms choose an optimal member by considering egress queue sizes of the ports in the aggregate group.

In the illustrative use case depicted in FIG. 5, the ingress accounting metrics (535 and 540) at the peer end are used in conjunction with the egress accounting metrics 530 when choosing an optimal member so that new flows can proactively choose congestion free paths. In embodiments, preference weights 525 may also be included in the calculation when choosing an optimal member for a flow.

Figure 6:
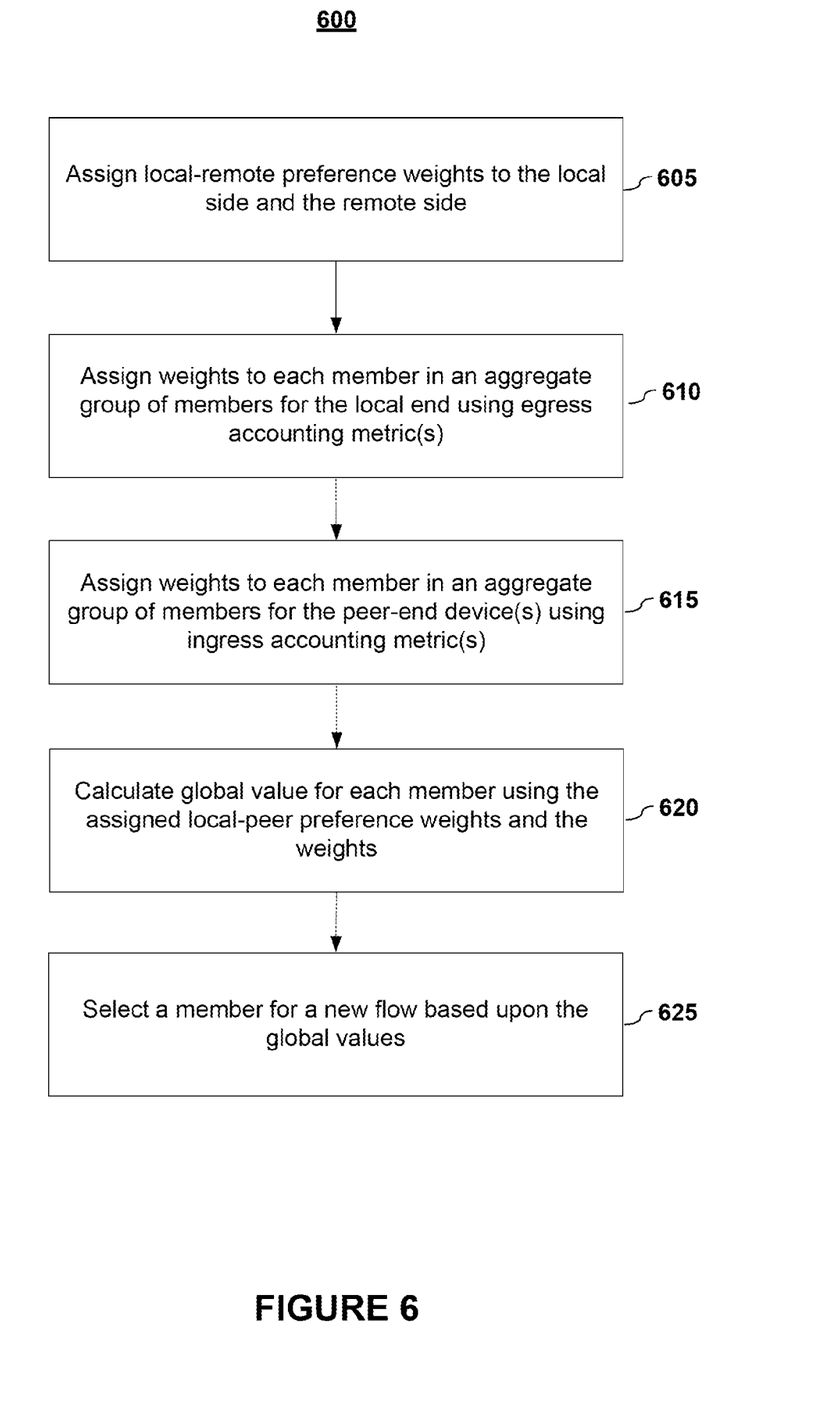
FIG. 6 depicts a methodology for determining a member for a flow according to embodiments of the present invention.

FIG. 6 depicts a methodology for determining a member for a flow according to embodiments of the present invention. In embodiments, local-remote preference weights (e.g., Preference Weights 525 in FIG. 5) are assigned (605) for the local side and for the remote side. It shall be noted that these preference weights may not be assigned or may be assigned by default. It shall also be noted that if no preference weights are assigned that effectively there is a default of 1 for the local and remote sides. It shall be noted that the preference weighs may be subjectively set by a user, may be objectively set based upon one or more metrics, or may be a combination thereof.

In embodiments, weights are assigned (610) to each member in an aggregate group of ports/members at the local end using egress accounting metric(s), and weights are also assigned (615) to each member in the aggregate group of members at the peer end device(s) using ingress accounting metric(s).

In embodiments, a global weight for each member in the group may be calculated (620) using the assigned local-peer preference weights and the weights/metrics. One skilled in the art shall recognize that a number of ways exists for combining or weighting factors and metrics and no particular methodology is critical to the present invention.

In embodiments, once a global value for each of the members in the group has been calculated, a member with the best value may be selected (625) for a new flow.

Consider, by way of illustration, the following example. Assume that 40 is the ingress accounting or queue size limit for congestion detection and for PFC to be generated. If the ingress node on Unit 2 510 has a current ingress accounting value of 20 and Unit 3 515 has a current ingress accounting value of 5, it is better for a new flow to choose the link Unit 1-Unit 3 550 since it is comparatively less prone to congestion and has sufficient resources.

In embodiments, the weights may be assigned as an inverse ratio of max-to-current utilization. Using this approach, in the above example, the Unit 1-Unit 3 path 550 would have peer weight 8 (40/5) and the Unit 1-Unit 2 path 545 would have peer weight 2 (40/20). Thus, member port at Unit 1 connected to Unit 3 is the optimal member for this group.

In embodiments, the weights may be exchanged using extensions to protocols in the Link Aggregation Control Protocol (LACP), where peer nodes would assign weights for each of the links and regularly share them with the node for making optimal member decision.

c. Use Case #3

Figure 7:
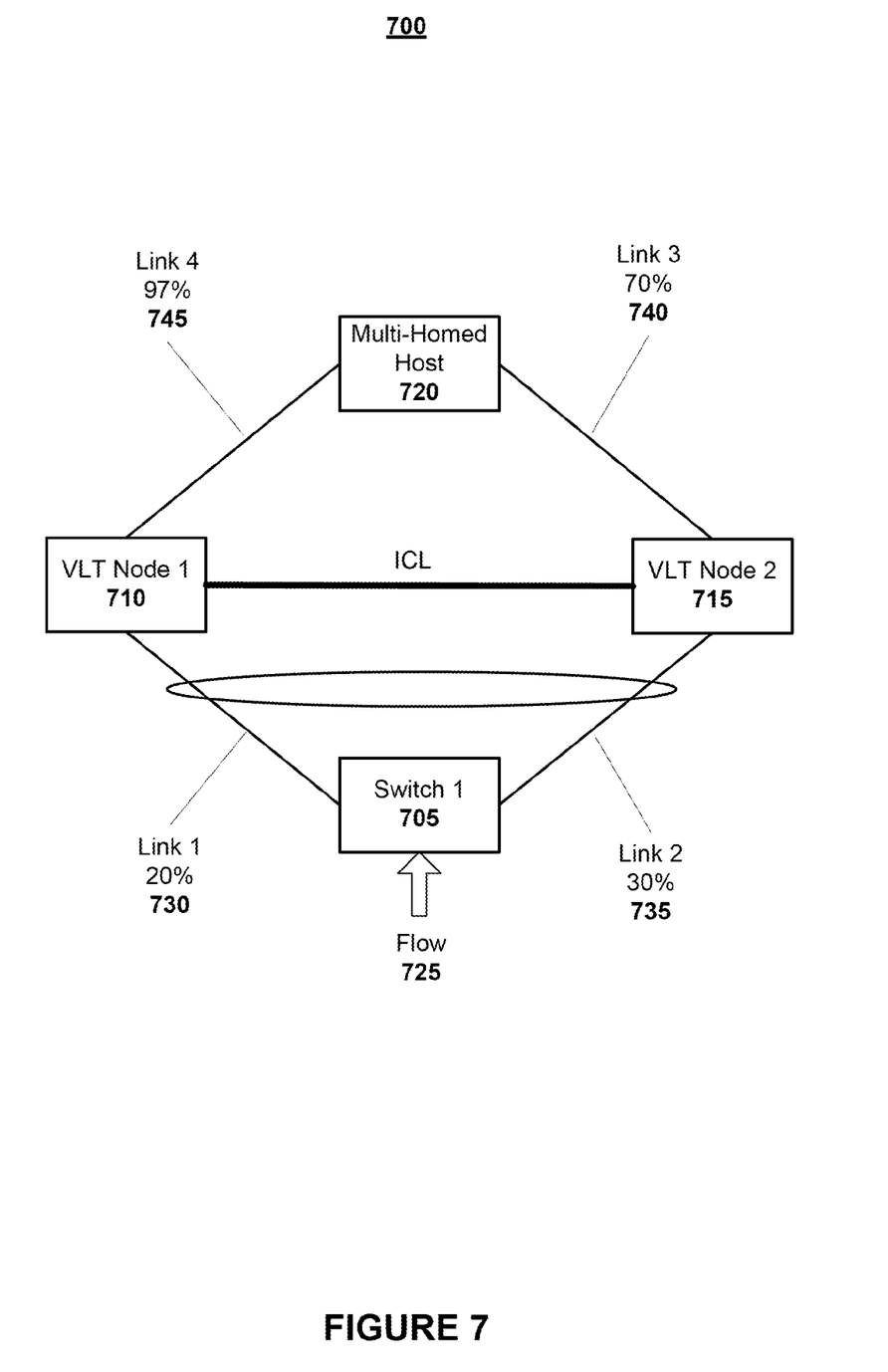
FIG. 7 depicts another use case of flow distribution to a multi-homed host in a VLT domain according to embodiments of the present invention.

FIG. 7 depicts another use case of flow distribution to a multi-homed host in a VLT domain according to embodiments of the present invention. Consider the topology depicted in FIG. 7. Switch 1 705 is connected to two VLT nodes, Node 1 710 and Node 2 715, through which traffic is sent towards a host, Host 720, which is multi-homed on the VLT nodes. Currently, the traffic distribution of the LAG in Switch 1 705 would take into account the usage of two links, Link 1 730 and Link 2 735. However, according to aspects of the present invention, the peer end can consider the utilization of Link 3 and Link 4 too and send it as a metric so that Switch 1 705 may use this information in making a decision for the optimal candidate.

Consider a scenario in which a new flow 725 is destined to the host 720 and also assume the following utilizations:

Link 1: 20%
Link 2: 30%
Link 3: 50%
Link 4: 95%

If the utilization of only Link 1 730 and Link 2 735 are considered, as is currently done, the optimal member would be Link 1. However, this would cause burden on Link 4 745, which is already at 95% of line rate. In contrast, the peer nodes 710 and 715 send metrics through which a collective decision may be made to update the optimal member to Link 2, which results in path Link 2-Link 3 to the host 720.

d. Use Case #4

Figure 8:
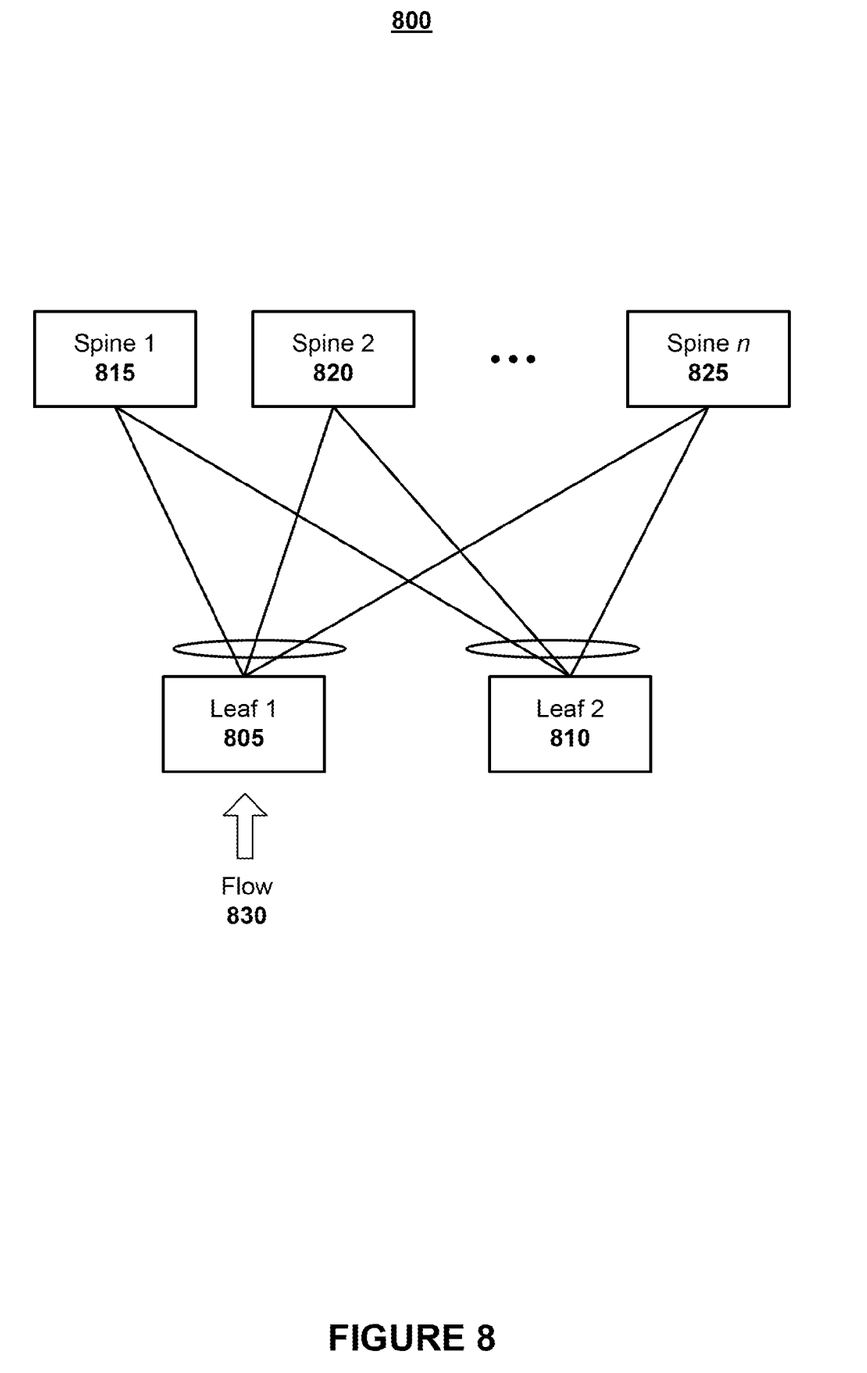
FIG. 8 depicts a flow in a leaf-spine architecture according to embodiments of the present invention.

Consider next assigning an optimal member in leaf-spine architecture in which a new flow is intended from one leaf to another. FIG. 8 depicts flow in a leaf-spine architecture 800 according to embodiments of the present invention. In leaf-spine architectures, a flow between two leaves can choose one of the spines. In current DLB mechanisms, the optimal member for a new flow is chosen based on egress port attributes like queue size or number of packets transmitted. However, the resources in the spine, like MMU, may be less, even the queue in the ingress leaf may be less or not used. This can be detected based on ingress accounting of the port connected on the spine to ingress leaf. If the ingress limit reaches a certain threshold or thresholds, PFCs are generated towards ingress spines which would result in queuing of packets.

To avoid using a spine node with fewer resources and to proactively avoid congestion, aspects of the present invention allow for a centralized decision making for a new flow so that new flows are directed to a leaf using spines with enough resources.

A Dynamic Load Balance (DLB) mechanism works as follows. DLB maintains a flow set table per aggregate group. The flow set table is indexed by output of RTAG7 hashing. When a new flow arrives which has a different RTAG7 hashing output, DLB flow set table is checked. The flow set table has a member port field. If the field has a member in it then the flow would be sent to the member port. For new flows, this field may be chosen from an optimal member register. This register may be updated using hardware or software. When updated using hardware, the logic may be specified to use current queue sizes, number of transmitted packets, etc. When software update is used, the hardware stops updating this register and it is the responsibility of software to update it regularly.

In embodiments, for each ingress box, accounting details are obtained from the spine. For example for Leaf 1 805, the ingress accounting details of the ports connected from each spine to Leaf 1 may be obtained. In general, the optimal spine would be the one which has the lower accounting value(s), meaning more MMU and less possibility of congestion being created since it has more capacity to hit the threshold to identify congestion.

However, even if the spine is optimal, the egress queues in the ingress leaf could be full and thus not be optimal at a local scope. To handle such situations, the decision to select an optimal member may be done on collective information based on local egress queue sizes and remote ingress accounting details at spine. The optimal member may be determined in such a way that it is not congested locally and also will not create congestion in the spine.

In embodiments, the weights may be assigned to local metric(s) as well as remote metric(s), and correspondingly, an optimal member may then be determined.

In embodiments, the ingress accounting details may be exchanged from spine to leaf regularly on configured intervals or otherwise using internal inter-process communication (IPC) mechanism. Locally, the queue sizes are obtained. If, for example, local metric(s) and peer metric(s) are given certain weightage (which may be user-selected), then the member quality metric or value may be obtained as follows:

Member Quality Metric=Alg(Local weightage×local quantized value, Remote weightage×remote quantized value)

Based on queue size values at the egress port of ingress leaf, the quantization may be done similar to DLB. Similarly, in embodiments, the remote ingress accounting details may be quantized in which numerical values are assigned based on ingress or egress accounting details. A weighted mean algorithm or the like may then be used and the output is used in selecting the best member.

In embodiments, this mechanism may be performed at regular or other intervals to update the optimal member.

e. Use Case #5

Figure 9:
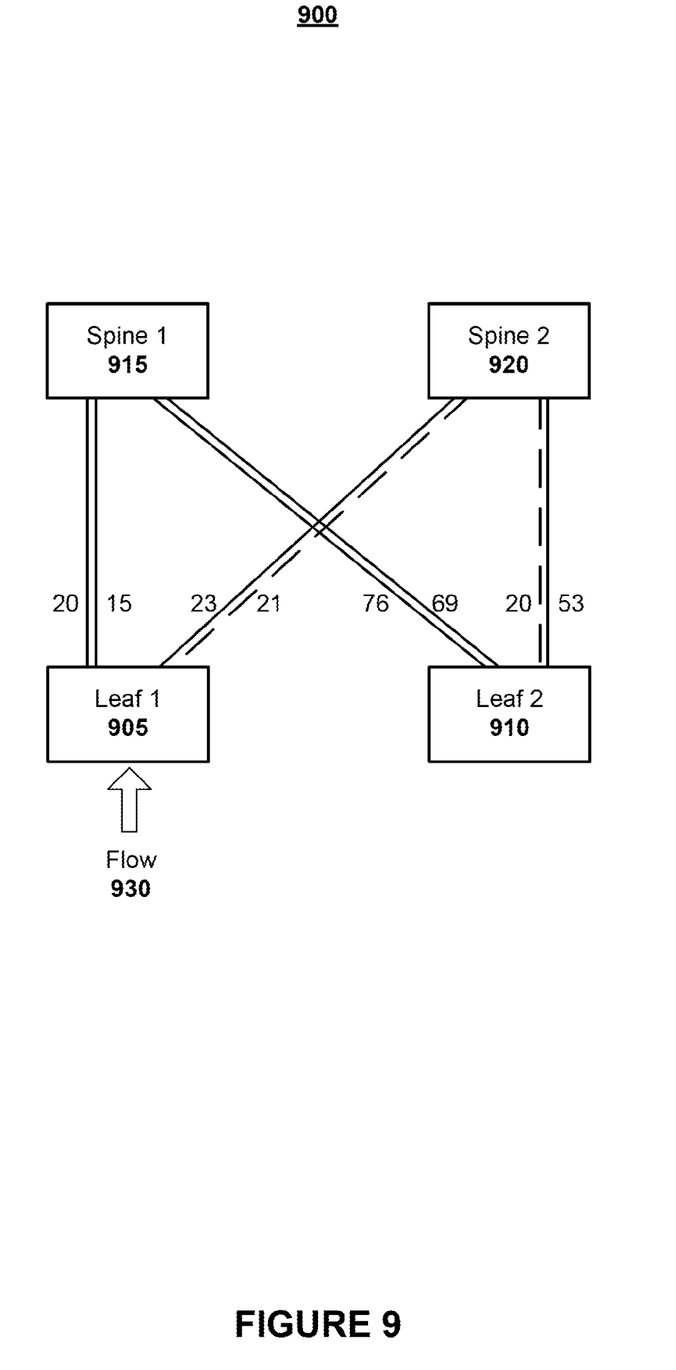
FIG. 9 depicts a flow in a dual leaf-spine architecture according to embodiments of the present invention.

FIG. 9 depicts flow in a dual leaf-spine architecture 900 according to embodiments of the present invention. In dual leaf-spine architectures as depicted in FIG. 9, the data traffic towards the spine would take one of the leaves. In the leaf, the optimal member may be set based on a global decision based on leaf-to-leaf utilization.

For example, in the topology depicted in FIG. 9, the optimal candidate at a local level on Leaf 1 905 would be a port connected to Spine 1 915 (e.g., the port with utilization of 15). However, if the end-to-end utilization is considered, then the optimal candidate would the second port connected to Spine 2 920 with a utilization of 21 because the utilization from Spine 2 (20 and 53) to Leaf 2 is better than from Spine 1 (76 and 69). In embodiments, this value may be written into an optimal candidate register; that is, the value of optimal member which was calculated using the above metrics may be written into a register used by DLB to help selecting optimal member for a new flow. It shall be noted that this methodology allows for considering the full end-to-end path (e.g., Leaf 1 Egress→Spine Egress→Leaf 2 ingress).

3. Information Handling System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 10:
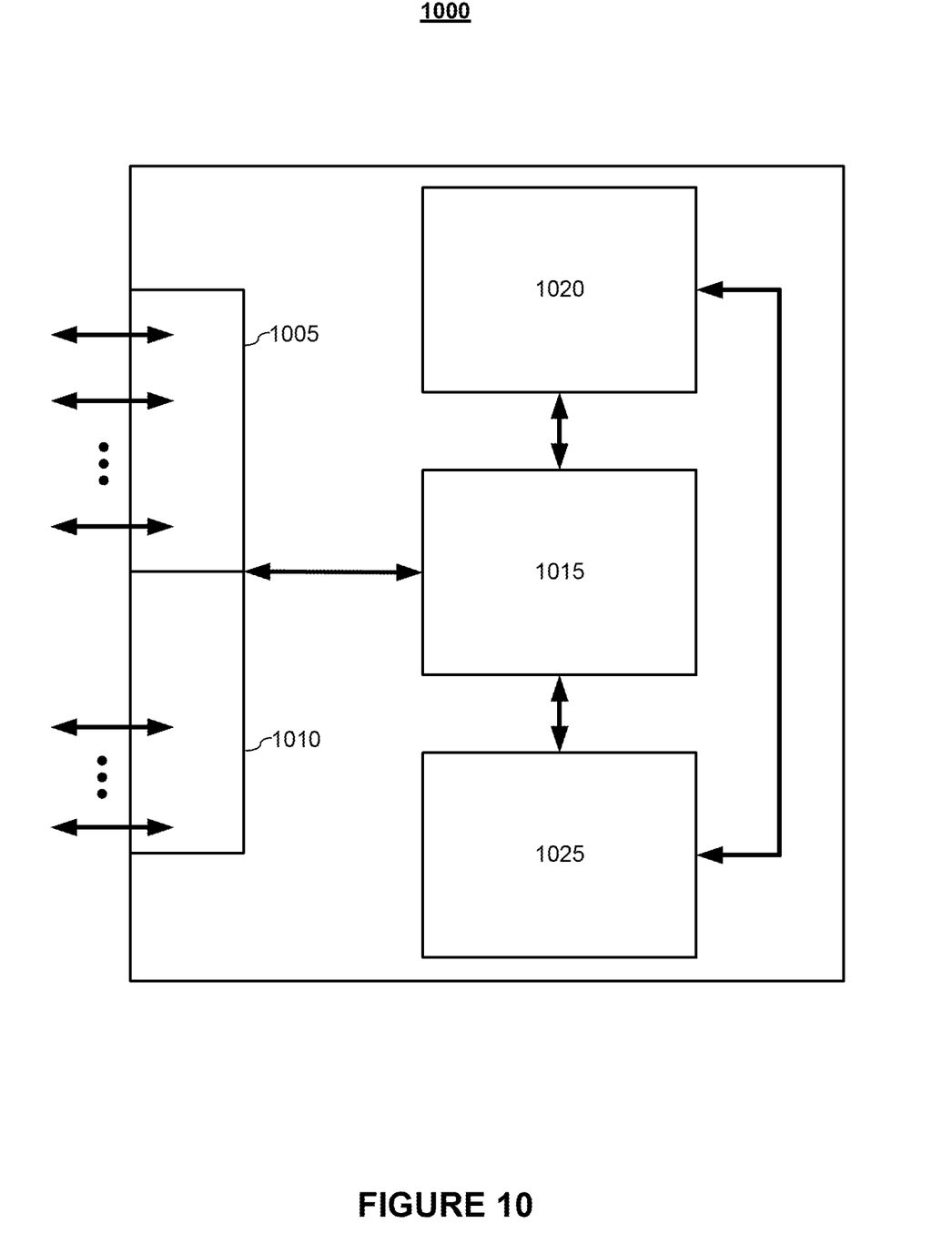
FIG. 10 depicts an exemplary information handling system according to embodiments of the present invention.

FIG. 10 depicts a simplified block diagram of an exemplary information handling system according to embodiments of the present invention. It will be understood that the functionalities shown for device 1005 may operate to support various embodiments of an information handling system (or node)—although it shall be understood that a node may be differently configured and include different components. The information handling system 1005 may include a plurality of I/O ports 1010, a network processing unit (NPU) 1015, one or more tables 1020, and a central processing unit (CPU) 1025.

In embodiments, the I/O ports 1010 may be connected via one or more cables (e.g., break-out cable 1040 and normal cable 1045) to one or more other network devices or clients. The network processing unit (NPU) 1015 may use information included in the network data received at the node 1005, as well as information stored in the tables 1020, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. An information handling system (IHS) comprising:
  a plurality of ports, at least one of the plurality of ports being configured to receive a new flow and at least two or more of the ports forming an aggregate group of members, each member being potentially used as an egress for the new flow from the IHS to one or more remote devices;
  one or more processors that are communicatively coupled to the plurality of I/O ports; and
  a memory that is communicatively coupled to the one or more processors and stores one or more sequences of instructions, which when executed by one or more processors causes steps to be performed comprising:
    assigning an IHS-side weight to each member in the aggregate group of members;
    assigning a remote-side weight to each member in the aggregate group of members, a remote-side weight being obtained from a remote device corresponding with the member;
    calculating a global value for each member in the aggregate group of members using the IHS-side weights and the remote-side weights; and
    selecting for egress of the new flow a member from the aggregate group of members based upon the global values.

2. The information handling system of claim 1 further comprising:

receiving IHS-remote preference weights that indicate a weighting preference for the an IHS-side weights and the remote-side weights; and wherein the step of calculating a global value for each member in the aggregate group of members using the IHS-side weights and the remote-side weights also comprising using the IHS-remote preference weights.

3. The information handling system of claim 2 wherein the IHS-remote preference weights are user selected.

4. The information handling system of claim 2 wherein the step of assigning an IHS-side weight to each member in the aggregate group of members comprises basing the IHS-side weight for a member upon one or more metrics related to utilization of the member at the IHS.

5. The information handling system of claim 2 wherein the step of assigning a remote-side weight to each member in the aggregate group of members comprises basing the remote-side weight for the member upon one or more metrics related to utilization of the member at the remote device.

6. The information handling system of claim 5 wherein the remote-side weights are received from the one or more remote devices.

7. The information handling system of claim 1 further comprising:
re-calculating the global values at different instances of time.

8. The information handling system of claim 7 further comprises, prior to the step of re-calculating the global values:
updating at least some of the IHS-side weights and the remote-side weights.

9. A processor-implemented method assigning a member from an aggregate group of members as an egress for a new flow received at a local device to a remote device, the method comprising:
assigning a local-side weight to each member in the aggregate group of members;
assigning a remote-side weight to each member in the aggregate group of members, a remote-side weight being obtained from a remote device corresponding with the member;
calculating a global value for each member in the aggregate group of members using the local-side weights and the remote-side weights; and
selecting for egress of the new flow a member from the aggregate group of members based upon the global values.

10. The processor-implemented method of claim 9 further comprising:
receiving local-remote preference weights that indicate a weighting preference for the an local-side weights and the remote-side weights; and
wherein the step of calculating a global value for each member in the aggregate group of members using the local-side weights and the remote-side weights also comprising using the local-remote preference weights.

11. The processor-implemented method of claim 10 wherein the local-remote preference weights are user selected.

12. The processor-implemented method of claim 10 wherein the step of assigning an local-side weight to each member in the aggregate group of members comprises basing the local-side weight for a member upon one or more metrics related to utilization of the member at the local device.

13. The processor-implemented method of claim 10 wherein the step of assigning a remote-side weight to each member in the aggregate group of members comprises basing the remote-side weight for the member upon one or more metrics related to utilization of the member at the remote device.

14. The processor-implemented method of claim 13 wherein the remote-side weights are received from the one or more remote devices.

15. The processor-implemented method of claim 9 further comprising:
re-calculating the global values at different instances of time.

16. The processor-implemented method of claim 15 further comprises, prior to the step of re-calculating the global values:
updating at least some of the local-side weights and the remote-side weights.

17. An information handling system (IHS) comprising:
a plurality of ports, at least one of the plurality of ports being configured to receive a new flow and at least two or more of the ports forming an aggregate group of members, each member being potentially used as an egress for the new flow from the IHS to one or more remote devices;
one or more processors that are communicatively coupled to the plurality of I/O ports; and
a memory that is communicatively coupled to the one or more processors and stores one or more sequences of instructions, which when executed by one or more processors causes steps to be performed comprising:
assigning an IHS-side weight to each member in the aggregate group of members using one or more IHS-side egress accounting metrics;
assigning a remote-side weight to each member in the aggregate group of members using one or more ingress accounting metrics, a remote-side weight being obtained from a remote device corresponding with the member;
calculating a global value for each member in the aggregate group of members using the IHS-side weights and the remote-side weights; and
selecting for egress of the new flow a member from the aggregate group of members based upon the global values.

18. The information handling system of claim 17 further comprising:
receiving IHS-remote preference weights that indicate a weighting preference for the an IHS-side weights and the remote-side weights; and
wherein the step of calculating a global value for each member in the aggregate group of members using the IHS-side weights and the remote-side weights also comprising using the IHS-remote preference weights.

19. The information handling system of claim 18 wherein the IHS-remote preference weights are user selected.

20. The information handling system of claim 17 further comprising:
updating at least some of the IHS-side weights and the remote-side weights; and
re-calculating the global values.

* * * * *